United States Patent Office 3,404,339
Patented Oct. 1, 1968

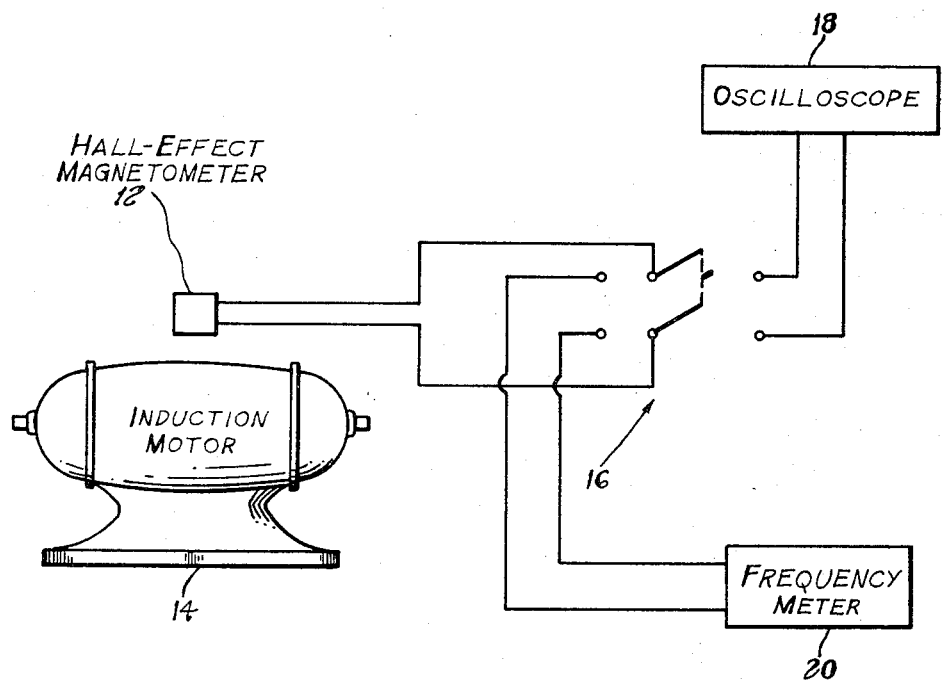

3,404,339
MEASUREMENT OF ROTATIONAL SPEED OF INDUCTION MOTORS
Dana D. Mitchell, Yonkers, N.Y., assignor to the United States of America as represented by the Secretary of the Navy
Filed Sept. 16, 1965, Ser. No. 487,938
2 Claims. (Cl. 324—70)

ABSTRACT OF THE DISCLOSURE

A method is proposed for measuring the speed of rotation of a rotor in a polyphase induction motor by measuring the magnetic field outside the motor housing, generated by the rotor current inside the housing when the rotor speed is not equal to the speed of rotation of the energizing field.

---

This invention relates to the measurement of the rotational speed of induction motors and especially to such measurement by means of a Hall-effect device.

The measurement of the rotor speed of motors is usually accomplished by the use of tachometers employing optical and magnetic sensors. Optical sensor operation is based on the modulation of a light beam by the periodic insertion of an opaque surface in the beam path or by periodically changing the reflectance or scattering ability of a reflecting element placed in the beam path. The modulation may be detected with a photoelectric device and read out with an analog or digital frequency meter.

Magnetic sensors such as the moving magnet, moving coil drag cup, variable reluctance, etc., types are used to produce a voltage or current which varies as the rotor speed or a multiple thereof. With the exception of the drag cup device which is mechanical, readout is accomplished with an analog or digital frequency meter.

Another type of sensor is the vibration sensor, usually of the tuned reed variety, which is strictly mechanical in action.

Both the optical and magnetic methods of rotor speed measurment require access to a rotating portion of the machine. When the motor is not provided with an already included expensive tachometer sensor, speed measurement is usually difficult because the rotating parts are inaccessible. The ultimate in such inaccessibility is found in the hermetically sealed motor compressor units used extensively by the refrigeration and air-conditioning industry.

Although vibration sensors do not require direct connection to the rotating parts whose speed is to be measured, they are severely limited by the multiplicity of vibrations which usually mask the vibration caused by the element of interest. More elaborate systems using frequency spectrum analyzers, etc., are impractical because of their complexity and high cost.

The present invention permits the measurement of the rotor-current frequency, and therefore rotor speed, of induction motors even where the rotating parts are completely inaccessible, through the use of a Hall-effect device to pick up the stray magnetic field of the rotor current. The electrical output of the Hall-effect device is fed to a frequency meter which indicates the frequency of the rotor current. This frequency is then used in a mathematical relationship which permits calculation of the rotor speed.

An object of this invention is to permit the rotor speed of induction motors to be obtained easily and simply without the use of expensive devices, and even where the rotating parts of the motors are completely inaccessible.

Other objects and many of the attendant advantages of this invention will be readily appreciated as the same becomes better understood by reference to the following detailed description when considered in connection with the accompanying drawings wherein:

The single figure is a schematic diagram illustrating the invention.

Referring to the figure, a Hall-effect magnetometer 12, which may, for example, be a Bell 240 Incremental Gaussometer, is placed on or near the casing of an induction motor 14. The output of the magnetometer is fed to the center terminals of a double-pole, double-throw switch 16, which at the outset, is connected to feed the signal to a low-frequency oscilloscope 18. The oscilloscope is used to monitor the magnetometer output while the magnetometer is being positioned for maximum output signal.

Once maximum output signal is obtained from the magnetometer, the switch 16 is thrown to its other position and the magnetometer output signal is fed to a frequency meter which indicates the frequency of the rotor current. This meter may also be a period-indicating meter $$\left(\text{since frequency} = \frac{1}{\text{period}}\right)$$

or any device from whose output frequency can be obtained. The frequency of the rotor current is given by:

$$f_r = \frac{\left(\frac{120}{p}\right)f - N}{\left(\frac{120}{p}\right)}$$

and the rotor speed is then:

$$N = \frac{120}{p}(f - f_r)$$

where $N$ = rotor speed in revolutions per minute
$f$ = power source frequency
$f_r$ = frequency of the rotor current
$p$ = number of poles of motor Probe placement is rather uncritical although in most cases the region of maximum rotor field can be found near the longitudinal midpoint of the motor casing. If the instrument tends to saturate on the strong 60 c.p.s. stator field which is present, the probe (magnetometer) can be oriented to null out the stator field while still responding satisfactorily to the rotor field.

The instrument can be made very rugged and reliable by transistorizing the electronic components and encapsulating the magnetometer probe. There are no moving or vibrating parts to give inherent wear problems.

The installation can be either permanent or temporary. Temporary installations can be made in a matter of seconds, thus making the invention valuable in production line testing of induction-motor-driven machines whose moving parts are inaccessible.

A portable version of the invention can be used as a diagnostic aid in checking for motor overload and rotor speed fluctuations. Refrigeration equipment in the field can be checked for signs of imminent failure.

Obviously many modifications and variations of the present invention are possible in the light of the above teachings. It is therefore to be understood that within the scope of the appended claims the invention may be practiced otherwise than as specifically described.

I claim:
1. In a method for measuring the rotational speed of a rotor of a polyphase induction motor employing the formula $$N=\frac{120}{p}(f-f_r)$$

where $N$=rotor speed in r.p.m.
$f$=power source frequency
$f_r$=frequency of the rotor current
$p$=number of poles of said motor, the improvement of:
placing a Hall-effect magnetometer adjacent the outer surface of the casing of said induction motor to generate a signal whose frequency $f_r$ corresponds to the frequency of the magnetic field which is outside said casing and which is generated by rotor current inside said casing and
measuring the frequency $f_r$ of the signal generated by said Hall-effect magnetometer to thereby permit determination of said rotational speed $N$ by insertion of the measured frequency $f_r$ in said formula.

2. The method as recited in claim 1 wherein said magnetometer is located adjacent the longitudinal midpoint of the motor casing.

References Cited
UNITED STATES PATENTS

| | | | |
|---|---|---|---|
| 3,077,760 | 2/1963 | Packard | 74—5.4 |
| 3,188,620 | 6/1965 | MacCallum | 324—70 |
| 3,218,872 | 11/1965 | Swainson | 74—5 |
| 3,321,705 | 5/1967 | Levitt | 324—70 |

FOREIGN PATENTS

| | | |
|---|---|---|
| 154,105 | 10/1963 | U.S.S.R. |
| 1,178,513 | 9/1964 | Germany. |

RUDOLPH V. ROLINEC, *Primary Examiner.*

M. J. LYNCH, *Assistant Examiner.*